INVENTOR
HISAO KINJO
TOSHI SUZUKI

BY Louis Bernat

ATTORNEY

INVENTOR
HISAO KINJO
TOSHI SUZUKI

BY Louis Bernat
ATTORNEY

United States Patent Office 3,445,608

Patented May 20, 1969

3,445,608

COMMUTATOR SWITCHING SYSTEM FOR ROTATING HEAD RECORDERS

Hisao Kinjo, Yokohama, and Toshi Suzuki, Kamakura, Japan, assignors to Victor Company of Japan Limited, Yokohama, Japan, a corporation of Japan Filed May 16, 1966, Ser. No. 550,398
Claims priority, application Japan, May 21, 1965, 40/29,915
Int. Cl. G11b 5/02, 5/48
U.S. Cl. 179—100.2 10 Claims

ABSTRACT OF THE DISCLOSURE

A system for magnetically recording and playing back television signals converts the continuous TV signals into intermittent tracks having overlapping signals at the opposite ends of adjacent tracks. A commutator sequentially enables and disables each of two rotating transducer heads, each head reading one intermittent track when it is enabled. The commutator establishes a time sequence wherein: one of the heads is switched between active and inactive states, then a signal in at least one of the intermittent tracks is attenuated, and thereafter the other head is switched between its active and inactive states. Before such switching one head is active, and after such switching the other head is active. During overlap, the attenuated signal from one head is rendered ineffective by a masking effect from the unattenuated signal read by the other head. This way, there are no abrupt transients, or other noise, when both heads simultaneously read out in the overlapping zone.

This invention relates to magnetic recording and reproducing systems, and more particularly to systems for recording and reproducing video signals or the like.

Recorders of the type contemplated by this invention include a plurality of corotatable equiangularly spaced magnetic heads. These heads are moved past a magnetic recording medium for sequentially tracing intermittent tracks thereon to record a video signal, a field at a time. During playback these same heads are moved along the same tracks to reproduce the recorded video signal. The problem is that it is necessary to switch between heads at the end of the tracks without noise or deterioration of the picture. The system of this invention is very simple in construction and operation and yet it switches with little or no problems. It is highly reliable and stable. It avoids the generation of noise, heat, interference components, or the like.

Several known systems rely on a plurality of rotary magnetic heads for recording a continuous frequency modulated video signal as intermittent signals. These systems use the same heads for reproducing the same intermittent signals as continuous video signals. However, there are difficulties when attempts are made to provide a satisfactory switching system for instantaneously switching in order to combine the intermittent signals into a continuous signal. There is a considerable improvement when a channel mixing system combines intermittent signals which are partially overlapped, and an overlapping portion of one signal is electrically clamped to a lower signal strength level for mixing with the overlapping portion of the other signal. Although a channel mixing system of this type can be highly satisfactory, it has a disadvantage in that it requires complex electric circuits as a means for change-over or as a means for processing overlapping portions of signals.

The present invention overcomes these disadvantages by providing mechanical commutator means whereby the overlapping portions of the intermittent signals can be blended responsive to an arrangement for providing electric connections between magnetic heads and a stationary circuit, without requiring a recourse to complex electronic circuits.

A principal object of this invention is the provsion of an apparatus for magnetic recording and reproducing a video signal. A further object is to provide such an apparatus which is very simple in construction. Yet another object is to enable the recording of a continuous signal as intermittent signals and the reproduction of the same as an excellent continuous signal.

Another object is the provision of a novel and useful apparatus for magnetic recording and reproducing of a video signal wherein overlapping portions of intermittent signals are processed at a commutator assembly, whereby an excellent continuous signal can be obtained during reproduction.

According to an important feature of the invention, commutator means are provided for sequentially connecting a plurality of corotatable heads to a stationary circuit. During each overlap period, while two of the heads are connected simultaneously to the stationary circuit, attenuator means are connected in a circuit with one of the heads. This arrangement insures the reproduction of a continuous signal since there is a difference in the levels of signal strength from the two heads during each overlap period. Even when there is a 180 degree phase difference between the intermittent signals, an output signal of substantial amplitude can be produced. The arrangement is particularly advantageous in the recording and reproducing of frequency modulated signals because demodulation can be performed with high fidelity with relatively great changes in amplitude, provided that a signal above a certain amplitude level is always applied to the demodulation circuit.

In one preferred arrangement, the commutator means is operative during recording to connect the attenuator means in circuit with one of the heads. In another preferred arrangement, the commutator means is so operative during reproduction.

According to a specific feature of the invention, the commutator means comprises a plurality of elements in the form of arcuately extending segments and comprises another plurality of elements in the form of brushes engageable with the segments. One group of these elements is electrically connected to and rotatable with the heads. The other group is connected to the stationary circuit. Preferably, the commutator segments are connected to the heads and the brushes are connected to the stationary circuit.

Another specific feature of the invention is in the support of the brushes in side-by-side relation for engagement with side-by-side portions of the commutator segments, with the brushes and segments being so arranged that two of the segments are engaged by two of the brushes.

According to a further feature of the invention, the attenuator means comprises a series resistor which is preferably connected between one of the brushes and the stationary circuit.

This invention contemplates other objects, features and advantages which will become apparent as the description proceeds with reference to the accompanying drawings wherein.

Figure 6:
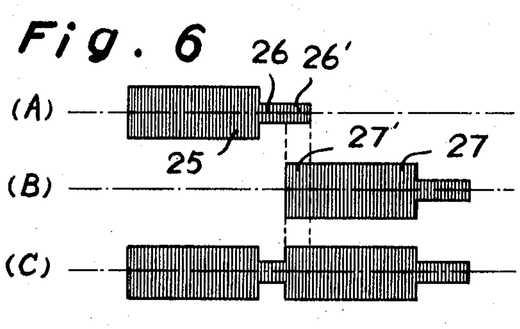
Figure 7:
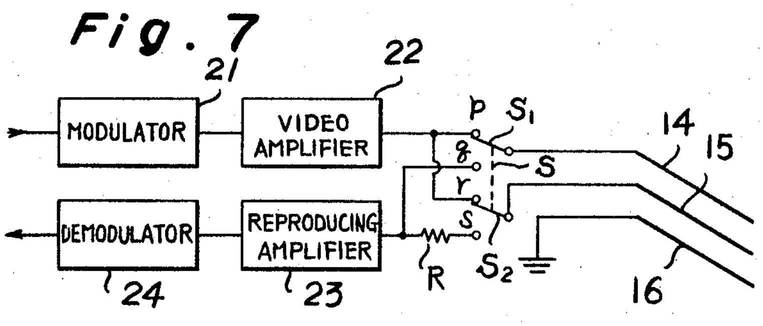

FIGURES 4(A), 4(B), 4(C) and 4(D) are diagrammatic plan views of a signal changeover portion at an interface of the commutator segment assembly;

FIGURES 5(A), 5(B), 5(C) and 5(D) represent simplified block diagrams showing the connection of magnetic heads during conditions respectively depicted in FIGURES 4(A), 4(B), 4(C) and 4(D);

FIGURES 6(A), 6(B) and 6(C) are wave form diagrams in explanation of the operation of apparatus constructed according to the invention; and FIGURE 7 is a schematic view of another embodiment of the apparatus according to the invention.

The illustrated embodiments of the commutator means are designed for controlling a two-head system for magnetic recording and reproducing of a video signal. More particularly, two rotary magnetic heads mounted on a rotating disk are activated alternately to record or play back video signals on a magnetic tape in diagonal tracks. It will be understood that the invention can be applied to any type of system using a plurality of equiangularly spaced co-rotatable heads or the equivalent thereof.

Figure 1:
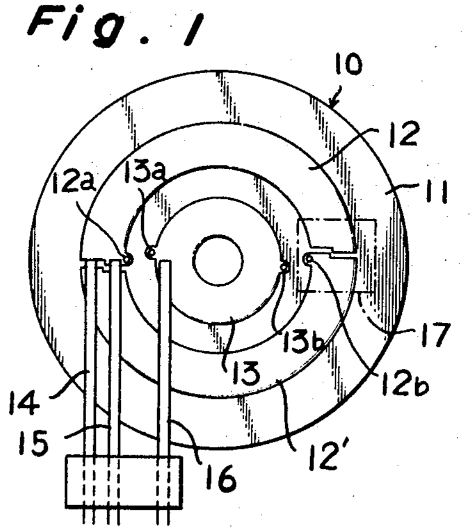
FIGURE 1 is a plan view showing one embodiment of a commutator assembly of a magnetic recording and reproducing system according to this invention.
Figure 2:
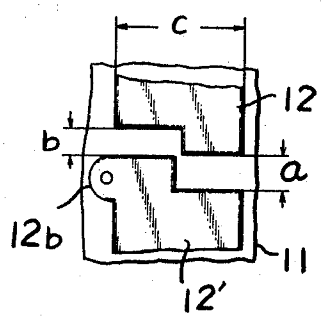
FIGURE 2 is a fragmentary plan view showing the interface parts of two commutator segments, the plan view being the assembly indicated by a broken line rectangle in FIGURE 1.
Figure 3:
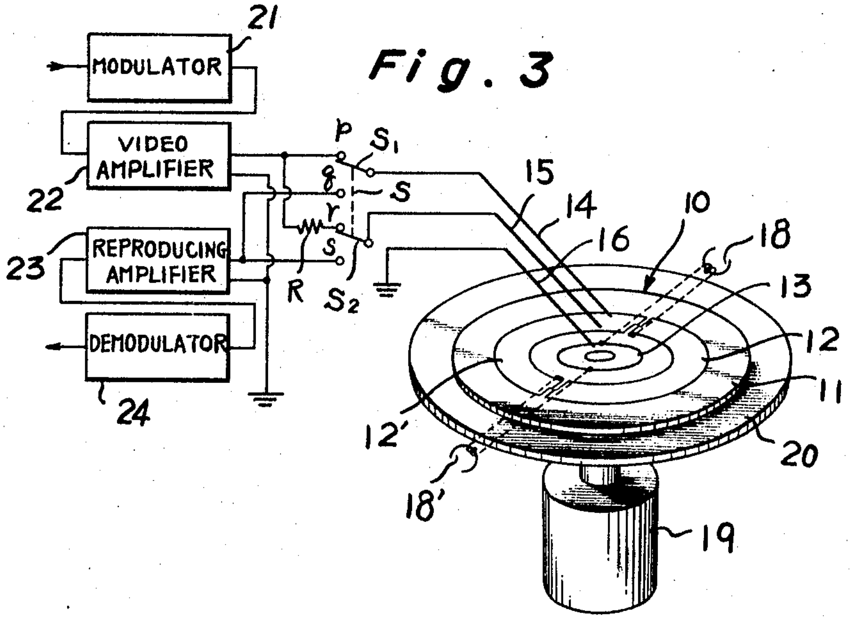
FIGURE 3 is a schematic view of one embodiment of a magnetic recording and reproducing system using the commutator assembly of FIGURE 1, according to this invention.
Figure 4:
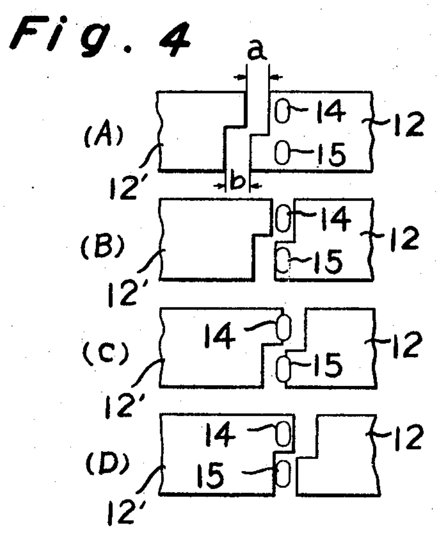
Figure 5:
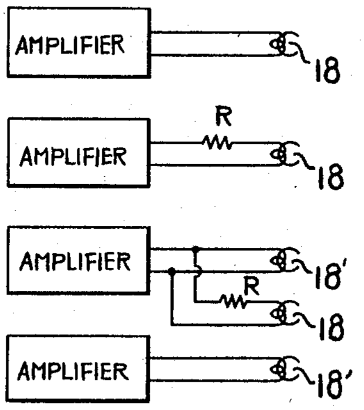

In FIGURES 1 to 3, reference numeral 10 generally designates a commutator assembly constructed according to the invention. Preferably, the assembly includes a disk 11, formed by printing semicircular conductive segments 12 and 12' and a circular conductive segment 13 on electrically insulating material, such as Bakelite. The segments 12, 12' and 13 are preferably of a special alloy which is highly resistant to frictional wear. Preferably, the circular conductive segment 13 is concentrically positioned in the center of the first-mentioned conductive segments 12 and 12', and it serves as a ground terminal. Reference numerals **12*a*, 12*b*, 13*a* and 13*b*** designate terminals for connecting the conductive segments to rotary magnetic heads respectively.

It is to be noted that the semicircular conductive segments 12 and 12' have ends adjacent each other to form interface gaps of substantially the same form in two diametrically opposite regions. One of these gaps, in a region 17, is shown in FIGURE 2 in enlarged form and is described hereinafter.

Brushes 14 and 15 bear on the semicircular conductive segments 12 and 12', and a brush 16 bears on the circular conductive segment 13. These brushes are preferably supported in any suitable manner so that the free ends thereof are aligned along a radius of the disk 11. The brushes 14 and 15 are supported for making contact with side-by-side portions of either the semicircular conductive segment 12 or the semicircular conductive segment 12', while the brush 16 is supported for making contact with the circular conductive segment 13.

FIGURE 2 is a view, on an enlarged scale, of the region indicated by the broken line rectangle 17, in FIGURE 1. This view shows the manner in which the adjacent or interfacing end portions of semicircular conductive segments 12 and 12' are formed and are spaced apart a certain distance from each other.

The exact widths of gaps *a* and *b* may vary, depending upon the time interval during which the video signals overlap between the two rotary magnetic heads. The circumferential length of each of the semicircular conductive segments 12, 12' is selected to coincide with the scanning time for transmitting one field of video signal to the corresponding rotary magnetic head. The widths of the gaps correspond to the areas of contact surfaces of the brushes. For example, gaps *a* and *b* may be of such a width such that the front ends of the brushes 14 and 15 do not come into simultaneous contact with the semicircular conductive segments 12 and 12'. These gaps are formed between the opposing ends of the semicircular conductive segments 12 and 12', and they are positioned on the right and left sides of the center line longitudinally dividing the segments into two equal parts across the width C thereof.

The gaps *a* and *b* provide means for converting a continuous TV signal into intermittent signals for each field. That is, one field is recorded on one track while brushes 14, 15 ride on one of the segments, and another field is recorded while they ride on the next segment. The gap width sets the time interval during which an intermittent signal is attenuated for processing an overlapping portion during playback and the time interval during which signals are overlapped during recording. In this embodiment, an intermittent signal is arranged such that it is attenuated (FIG. 6) for an interval which is four times as long as a horizontal synchronizing pulse interval H. This attenuation occurs at a predetermined position in the vertical blanking interval. The front end portion 26, 26' of the attenuated signal is twice as long as the interval H, and it overlaps a signal 27' of the next following field.

FIGURE 3 is a perspective view schematically showing the commutator assembly 10 in association with rotary magnetic head units 18, 18'. The assembly 10 is mounted on a shaft of an electric motor 19 and positioned above a rotating member 20 having the rotary magnetic heads 18 and 18' mounted at diametrically opposite positions thereon. Member 20 is also mounted on the same shaft of the electric motor 19. Thus the heads and commutator always move as a unit. It will be understood that the heads 18 and 18' are ararnged to trace successive tracks, preferably diagonal, on a magnetic medium, such as a magnetic tape. The beginning of the trace of each head is prior to the end of the trace of the other head to produce overlap periods wherein the same signals are recorded on opposite ends of adjacent tracks, as is well known in the art.

The brushes 14, 15, and 16 which are in sliding contact with the segments on the commutator assembly are connected to an input (or an output) of video signal magnetic recording (or reproducing) means. The brush 16 is connected to a common or ground terminal of the video signal magnetic recording and reproducing means. The brushes 14 and 15 are connected to center or working contacts $S_1$, $S_2$ of a relay S. The stationary contacts *p*–*s* are connected to input and output terminals of the video signal magnetic recording and reproducing means. The relay S is operated as the video signal magnetic recording and reproducing means is switched from a recording operation over to a reproducing operation, or vice versa.

When the video signal magnetic recording and reproducing means is performing a recording operation, the operating contact members $S_1$ and $S_2$ are connected to contacts *p* and *r*, respectively. The input video signal is frequency modulated by a modulator 21, passed through a video amplifier 22, and applied to the brush 14. At this time, the brush 15 is also connected to amplifier 22 in parallel with the brush 14 and also via an attenuating resistor R. During playback, switch members $S_1$ and $S_2$ are connected to contacts *q* and *s*, respectively. The brushes 14 and 15 are connected to each other by the relay contacts, so that signals on brushes 14 and 15 are directly mixed with each other. Thus, intermittent signals from the rotary magnetic heads are mixed with each other and converted into a continuous signal, which is introduced into a reproducing amplifier 23, and then passes through a demodulator 24 to become a reproduced and demodulated output signal.

During reproduction, the system of this invention converts intermittent signals into a continuous signal. The commutator assembly develops signals having a strength which varies in level in the overlap period which was formed during recording when an applied continuous signal was recorded as successive intermittent signals.

If the relay S is operated to set the apparatus to a recording condition, the video signal applied from the video signal recording and reproducing means, as described hereinabove, passes through the modulator 21 and amplifier 22 to the brush 15, and to the brush 14 via the damping or attenuating resistor R. The value of the damping resistor R is selected so that overlapping portions of the output signals reproduced from the magnetic tape are in the range −12 to −14 decibels.

The brushes 14 and 15 effectively move simultaneously, in a sliding motion, on the semicircular conductive segments 12 and 12′ (it is not material whether the brushes move over the segments or the segments move past the brushes). When the brush 14 is disposed in the gap *a* between the opposing and interfacing ends of the semicircular conductive segments, no signal is transmitted through brush 14 to the rotary magnetic heads. The brush 15 is still disposed on a semicircular conductive segment, so that the signal damped or attenuated by the resistor R is transmitted to the rotary magnetic head.

The manner in which the overlapping portions of signals are processed by the brushes 14 and 15 will be explained with reference to FIGURES 4(A), 4(B), 4(C) and 4(D) which are four views, diagrammatically showing the positions of brushes 14 and 15 as they travel over the interface region between the semicircular conductive segments 12 and 12′ before and after signals are overlapped.

FIGURES 5(A), 5(B), 5(C), and 5(D) are four views indicating the connection of the rotary magnetic heads 18 and 18′ to the amplifier. The four views of FIGURE 5 are states which correspond to the states of FIGURES 4(A), 4(B), 4(C) and 4(D), respectively.

FIGURES 6(A) and 6(B) are schematic representations of the wave forms of the signals recorded in tracks on the magnetic tape by the first and second rotary magnetic heads 18 and 18′. FIGURE 6(C) is a schematic representation of the wave form of the reproduced signal which results from a combination of the wave forms of FIGURES 6(A) and 6(B).

Let us assume that a signal having the duration of one field is transmitted to the semicircular conductive segment 12. FIGURE 4(A) shows the positions of the brushes 14 and 15 immediately before the complete transmission of the signal through the semicircular conductive segment 12 to the rotary magnetic head 18. It will be observed that before the brushes 14 and 15 enter the interface gap, both brushes are in contact with the semicircular conductive segment 12. Thus, the signal being recorded, on the magnetic tape, is not damped or attenuated because the brush 15 (FIG. 3) is short-circuited by the brush 14. At this time, the magnetic head 18 is connected in an active state as shown in FIGURE 5(A), and the recorded signal has a form as shown at 25 in FIGURE 6(A).

As the commutator disk 11 rotates and the brushes 14 and 15 are disposed as shown in FIGURE 4(B), the brush 14 ceases to transmit the signal to the head 18. However, the brush 15 continues to transmit the signal to the head 18, and the signal is attenuated to have a signal strength which is at a level below the level of the signal transmitted by the brush 14. The attenuated signal is recorded on the magnetic tape, as shown at 26 (FIG. 6). At this time, the magnetic head 18 is still connected to the signal source via resistor R and brush 15, as shown in FIGURE 5(B).

When the brushes 14 and 15 are shifted to the positions shown in FIGURE 4(C), the input signal is transmitted through the brush 14 to the semicircular conductive segment 12′, and the head 18′ is switched from an inactive to an active state so that the signal of the second field begins to be recorded in the next following intermittent track on the magnetic tape. The brush 15 is still engaged with the semicircular conductive segment 12 at this time. Hence, the signal of the second field, which is attenuated, is still being recorded at the trailing end of the preceding intermittent track. Thus, the rotary magnetic heads 18 and 18′ are connected in parallel with each other, as shown in FIGURE 5(C). The signal applied through the brush 15 is attenuated by the damping resistor R at the changeover portion of the operation of the rotary magnetic heads. The overlapping signals are, therefore, as shown at 26′ and 27′ in FIGURES 6(A) and 6(B), respectively. These are the signals which are simultaneously recorded at the trailing end and the leading end of the intermittent tracks adjacent each other and which are recorded by rotary magnetic heads 18 and 18, respectively.

When the brushes 14 and 15 are further shifted to positions as shown in FIGURE 4(D), the brush 15 is released from its contact with the semicircular conductive segment 12. The signal of the second field is being recorded on the magnetic tape through the brush 14 and the rotary magnetic head 18′—which is connected as shown in FIGURE 5(D). The head 18 is now switched to its inactive state. Thereafter, the overlapping portion as described above is mechanically formed and recorded on the magnetic tape after a time interval which is about twice as long as the time interval H for each rotation of the commutator through 180 degrees.

To playback the signals thus recorded on the magnetic tape, the relay S is set to the reproducing position. The brushes 14 and 15 are connected in parallel with each other as described hereinabove. The overlapping portions are taken out from the ends of said two tracks on the magnetic tape by the first and second rotary magnetic heads, and they are directly mixed with each other to form a single continuous signal, as shown in FIGURE 6(C). Since there is a variation in level of about −12 to −14 decibels between the two signals that overlap one over the other, there is a transient state which generally prevents injurious effect on the overlapping signals, because the signal of lower level is absorbed by the signal of higher level due to a masking effect. This feature is particularly advantageous in the case of recording and reproducing of frequency modulated signals, as described previously.

FIGURE 7 shows another embodiment of the apparatus of this invention. In the embodiment of FIGURES 1 to 6, one of the overlapping video signals has its level lowered during the recording operation. The recorded signals are taken without change and mixed with each other during reproduction. However, with the embodiment shown in FIGURE 7, the video signals are recorded without alteration, and the level of one of the signals is altered during playback, in the manner described in connection with the first mentioned embodiment.

In the recording operation, the movable contact switch members S1 and S2 are brought into contact with stationary contacts *p* and *r*, and the video signals passing through the modulator 21 and amplifier 22 are recorded, without having their levels affected in any way. Again the magnetic heads 18 and 18′ successively become active to record intermittent signals in tracks adjacent each other on the magnetic tape, and with parts of the signals overlapping one over the other.

In the reproducing operation, the operating contact switch members S1 and S2 are brought into contact with the contacts *q* and *s*. One of the video signals taken out via the brushes 14 or 15 is passed through the resistor R, and its level is lowered in the same manner as in the recording operation with the first mentioned embodiment. This permits the processing of overlapping signals. Thus, the last mentioned embodiment (FIG. 7) makes it possible to simultaneously carry out the processing of overlapping signals and the mixing of the two signals during reproduction.

Since many different embodiments of this invention may be made without departing from the spirit and scope thereof, it is to be understood that we do not limit ourselves to the specific embodiments herein, but do intend to cover all equivalents falling within the invention.

We claim as our invention:

1. In a magnetic recording and reproducing system including a plurality of corotatable equiangularly spaced magnetic heads for sequentially tracing along tracks of a magnetic medium with the beginning of the tracing of each head being prior to the end of the tracing of the preceding head to produce overlap periods, a stationary circuit, attenuator means, and commutator means for sequentially connecting said heads to said stationary circuit and including means operative during each of said overlap periods to connect two of the heads to said stationary circuit while connecting said attenuator means in circuit with one of said two heads.

2. In a magnetic recording and reproducing system as defined in claim 1, recording signal supply means for applying a signal to said stationary circuit to be applied to said heads.

3. In a magnetic recording and reproducing system as defined in claim 2, said recording signal supply means comprising modulator means for supplying a frequency modulated signal.

4. In a magnetic recording and reproducing system as defined in claim 1, reproducing means coupled to said stationary circuit to receive signals reproduced by said heads.

5. In a magnetic recording and reproducing system as defined in claim 4, said reproducing means comprising frequency demodulator means.

6. In a magnetic recording and reproducing system as defined in claim 1, said attenuator means comprising a series resistor.

7. In a magnetic recording and reproducing system as defined in claim 1, said commutator means comprising a plurality of elements connected to said heads for rotation therewith, and a plurality of stationary elements connected to said stationary circuit, one of said pluralities of elements being in the form of a plurality of arcuately extending commuator segments and the other of said pluralities of elements being in the form of a plurality of brushes engageable with said commutator segments.

8. In a magnetic recording and reproducing system as defined in claim 7, said attenuator means comprising a resistor in series with one of the elements connected to said stationary circuit.

9. In a magnetic recording and reproducing system as defined in claim 7, said brushes being disposed in side-by-side relation for engagement with side-by-side portions of said commutator segments, and said brushes and commutator segments being arranged so that during each overlap period two of said commutator segments are engaged by two of said brushes.

10. In a magnetic recording and reproducing system as defined in claim 1, said commutator means comprising: a disk rotatable with said heads and having a generally planar surface, a circular segment on said planar surface connected electrically to terminals of all of said heads, a plurality of arcuate segments electrically connected to other terminals of said heads and arranged on said planar surface with adjacent ends spaced apart by small gaps and forming a ring in concentric relation to said circular segment, a brush engageable with said circular segment, and a pair of brushes engageable with said arcuate segments and at different radial distances from the axis of rotation of said disk, said attenuator means comprising a resistor in series with one brush of said pair of brushes.

References Cited

UNITED STATES PATENTS

| | | | |
|---|---|---|---|
| 3,117,188 | 1/1964 | Anderson et al. ---- | 179—100.2 |
| 3,239,603 | 3/1966 | Kihara ----------- | 179—100.2 |

BERNARD KONICK, *Primary Examiner.*

J. RUSSELL GOUDEAU, *Assistant Examiner.*

U.S. Cl. X.R.

178—6.6